United States Patent [19]

Moody

[11] 4,130,172
[45] Dec. 19, 1978

[54] ELECTRIC VEHICLE

[76] Inventor: Warren E. Moody, 95 Fiesta Way, Fort Lauderdale, Fla. 33301

[21] Appl. No.: 742,721

[22] Filed: Nov. 17, 1976

Related U.S. Application Data

[63] Continuation-in-part of Ser. No. 588,841, Jun. 20, 1975, abandoned.

[51] Int. Cl.$^2$ .................. B60K 1/00; B60K 17/04; B60L 15/20
[52] U.S. Cl. .................. 180/65 E; 74/242.15 R; 180/60; 180/72; 310/118
[58] Field of Search .................. 180/65 R, 65 E, 63, 180/62, 61, 60, 72, 71; 74/230.17 C, 242.9, 242.15 R; 310/115, 118

[56] References Cited

U.S. PATENT DOCUMENTS

| | | | |
|---|---|---|---|
| 632,805 | 9/1899 | Corson | 180/65 R |
| 707,923 | 8/1902 | Hedstrom | 180/72 X |
| 757,715 | 4/1904 | Aylsworth | 180/65 R X |
| 759,091 | 5/1904 | Gardner | 180/63 |
| 845,080 | 2/1907 | Hardegen et al. | 180/63 |
| 1,264,748 | 4/1918 | Apple | 180/62 |
| 1,338,042 | 4/1920 | Ross et al. | 180/62 |
| 2,208,710 | 7/1940 | Tjaarda | 180/65 E |
| 2,588,664 | 3/1952 | Schreck | 180/65 R X |
| 2,906,357 | 9/1959 | Pletka | 180/65 R X |
| 3,267,311 | 8/1966 | Lamparty | 180/65 R X |

FOREIGN PATENT DOCUMENTS 100835  8/1925  Austria .................. 310/118

*Primary Examiner*—Joseph F. Peters, Jr.
*Assistant Examiner*—Milton L. Smith
*Attorney, Agent, or Firm*—Edwin E. Greigg

[57] ABSTRACT

An electric motor vehicle drive system including a differential electric motor unit for the vehicle including a stator motor element mounted within a supporting frame and a rotor motor element rotatably mounted within the stator. The stator is connected to a first output shaft while the rotor output shaft is connected to a final output shaft through a one-to-one reverse mechanism which corrects or reverses the direction of the final output shaft. Thus, both shafts rotate in the same direction but at one-half relative armature and field structure r.p.m.'s with true differential action within the motor unit itself. The driving connection between the electric motor unit and the motor vehicle in this embodiment comprises a pulley belt combination connected to the vehicle drive wheels and the two output shafts of the motor unit with radius rods for maintaining the adjustable tension on the belt drive. So connected, there is compensation for unequal traction, turning of the vehicle, unequal wheel sizes, etc., and elimination of the usual rear axle reduction gear and differential assembly.

11 Claims, 8 Drawing Figures

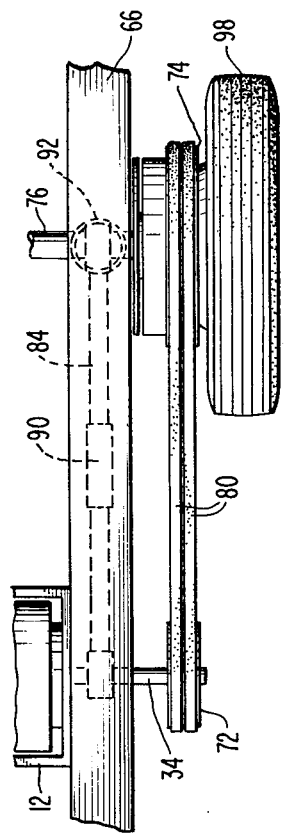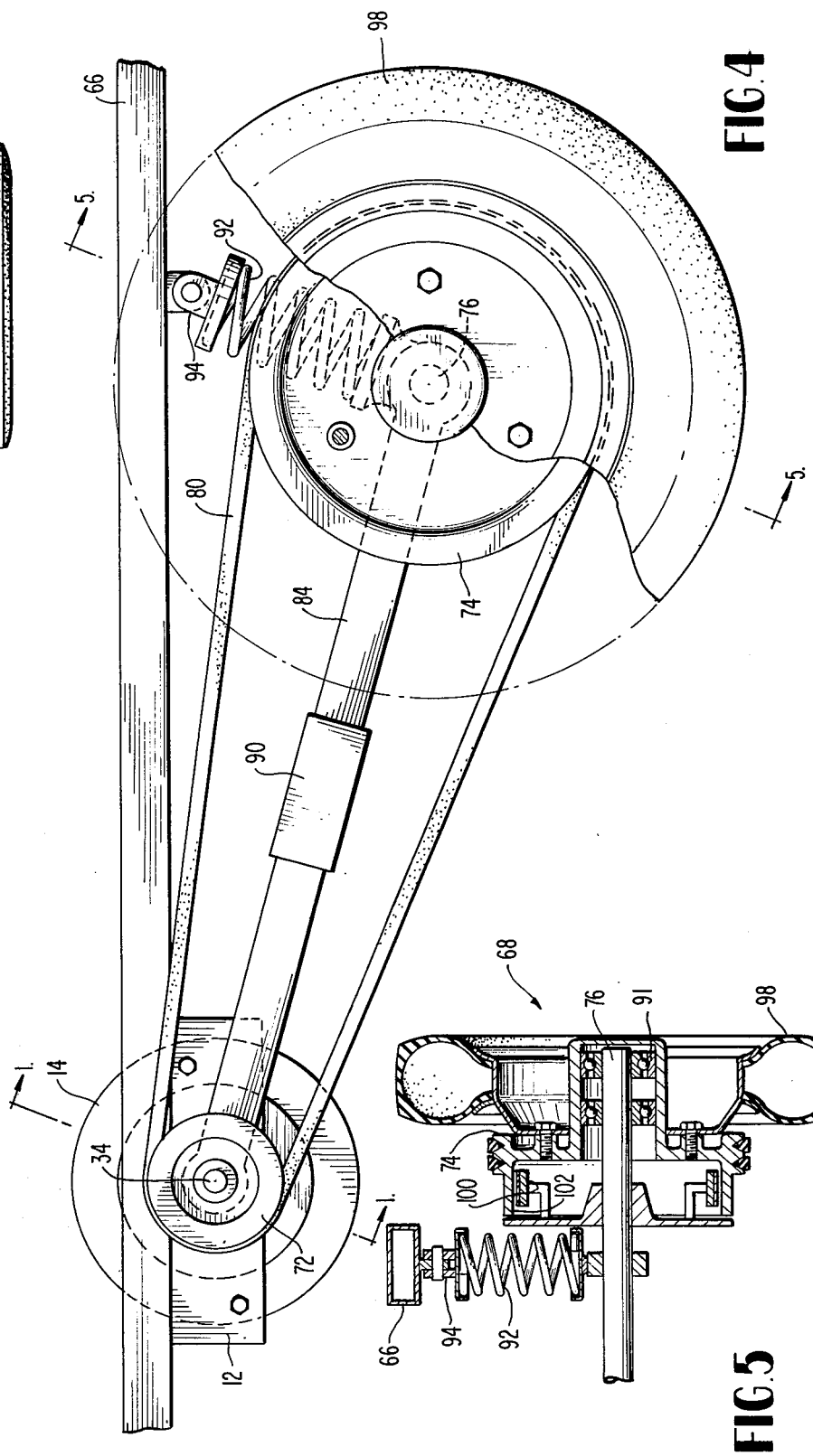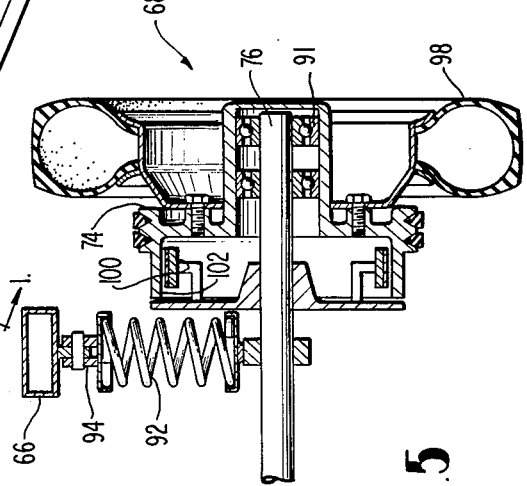

ELECTRIC VEHICLE

REFERENCE TO A RELATED APPLICATION

This is a continuation-in-part of application Ser. No. 588,841, filed June 20, 1975, now abandoned.

BACKGROUND OF THE INVENTION

This invention relates to electric vehicles and more particularly to a complete integrated motor drive system which can be used on various sizes and types of electric automobiles, electric fork-lift trucks, golf carts, etc.

Two important factors in the performance of an electric automobile are weight and drive efficiency inasmuch as the available power is very limited and any unnecessary weight coupled with an inefficient drive will still further reduce the range and performance of the vehicle, which, at present, is very poor. At present, such vehicles are being driven by an electric motor through a well-known ring gear and pinion differential which is expensive, bulky, heavy, and wastes power, all of which is very undesirable.

OBJECT AND SUMMARY OF THE INVENTION

It is, therefore, a main object of this invention to greatly improve the performance, increase the range, and reduce the weight and cost of an electric automobile.

To accomplish the foregoing object, there is disclosed a complete motor drive system that is light in weight, efficient in operation, economical to produce, and is the essence of simplicity for each maintenance.

In my invention, an electric motor provides a true differential action within itself and without added friction requiring only a simple reversing mechanism applied to either end to correct the opposite rotation of either output shaft to coincide with the other output shaft. The two output shafts are mechanically connected to two drive wheels of an electric vehicle providing a reasonably equalized load, so that when electric power is applied, a stator and rotor will rotate in opposite directions each at one-half of the r.p.m. By reversing or correcting opposite rotation of either output shaft with a simple one-to-one reversing mechanism, both output shafts are rotated in the same direction at one-half the rated motor speed. This makes it feasible to utilize smaller and lighter high-speed electric motor elements. The mechanical connection of the motor unit to the motor vehicle is a pulley belt combination with adjustable tensioning rods to maintain belt tension. This makes it possible to use conventional wheel mounts.

BRIEF DESCRIPTION OF THE DRAWINGS

FIG. 3 is a plan view of a portion of the frame of the motor vehicle incorporating the electric motor drive unit of FIG. 1;

FIG. 4 is a side elevational view enlarged over FIG. 3 and showing the details of the drive for the vehicle;

FIG. 5 is a sectional view taken along line 5-5 of FIG. 4;

DESCRIPTION OF THE PREFERRED EMBODIMENT

Figure 1:
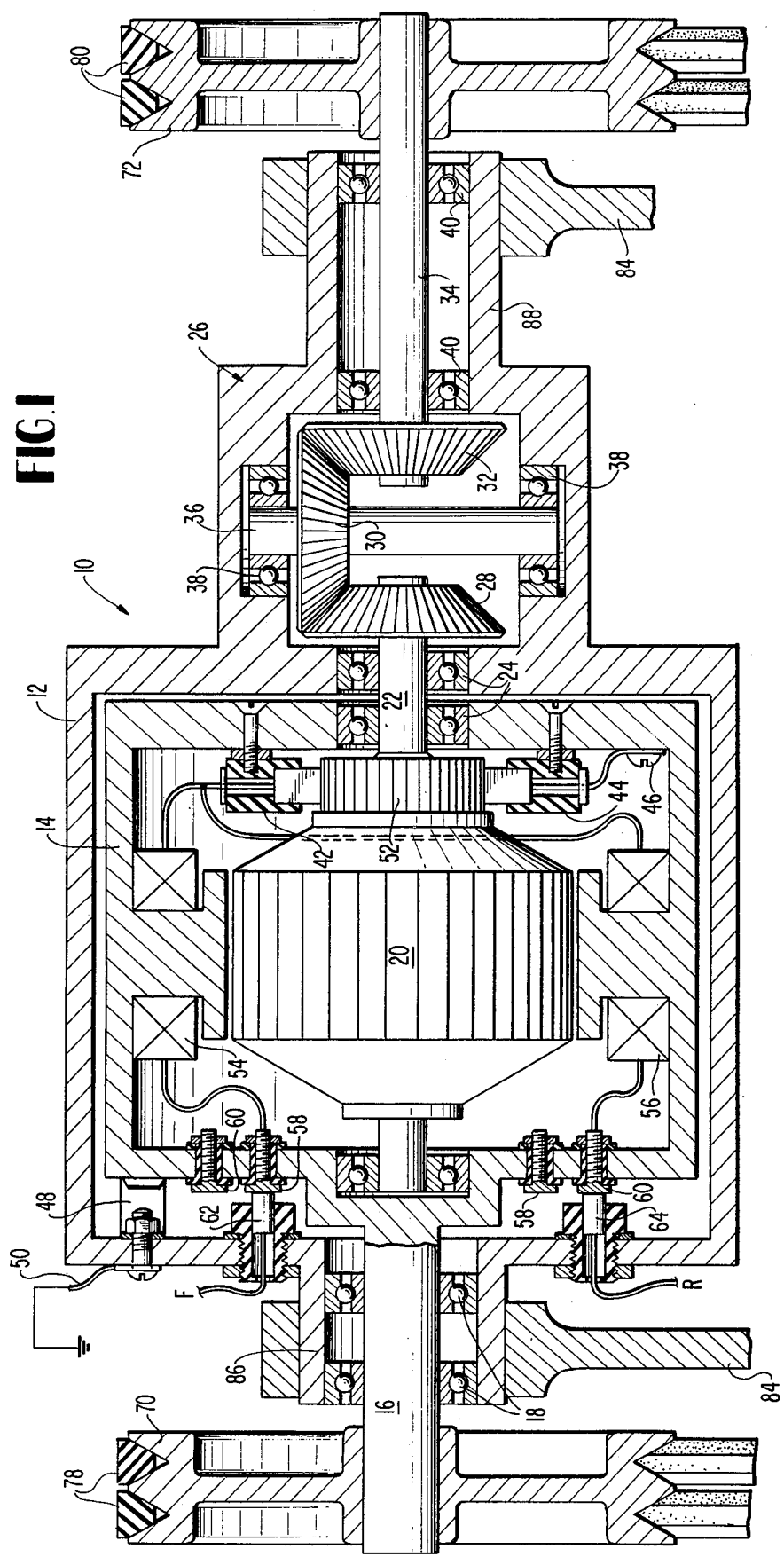
FIG. 1 is an elevational view in cross section showing the electric motor drive unit of this invention on section 1-1 of FIG. 4.

Turning first to FIG. 1 of the drawings, the differential electric motor drive unit of this invention is indicated in its entirety as 10, and comprises a supporting shell or frame 12 in which is rotatably mounted a stator or field structure 14 having an integral stator output shaft 16, journalled in suitable bearing means 18. Within this stator 14 is a rotor or armature 20 having an integral rotor or armature output shaft 22 extending in a direction opposite to shaft 16 and also suitably journalled in bearing means 24. Coupled to the armature output shaft 22 is a one-to-one coaxial reverse mechanism indicated in its entirety as 26. Reverse mechanism 26 comprises an output gear 28 fixed to the shaft 22 which meshes with an idler gear 30 and which, in turn, meshes with a final output gear 32 fixedly attached to a final or corrected output shaft 34. The idler gear 30 is suitably fixed on a mounting shaft 36 and, this mounting shaft 36, as well as the final or corrected armature output shaft 34, are all suitably journalled in bearing means 38 and 40, respectively, within the frame 12.

Within the stator 14 there is provided brush and holder combination 42 insulated from the stator 14, a second brush and holder combination 44 grounded to the stator 14 at 46 which, in turn, is suitably grounded to a stator grounding combination slip ring and brush 48. Slip ring and brush 48 are, in turn, connected to ground as at 50 through frame 12. The armature 20 is provided with a conventional commutator 52 coacting between the two brushes of the brush and holders 42, 44. Also mounted within the stator 14 is a forward field coil 54 and an oppositely wound reverse field coil 56. Forward field coil 54 is connected to radially mounted slip ring 58 insulated from the stator 14, while reverse field coil 56 is connected to radially mounted slip ring 60, also insulated from the stator 14. Slip rings 58 and 60 are respectively coupled to suitable spring-loaded brush and holder combinations 62 and 64 for connecting the coils to a suitable source of power.

When electric power from any suitable source, such as a battery, applied by a suitable speed control system (not shown), is to be directed to the selected desired field coil, such as the forward field coil 54, the wiring F is connected to such power. Power is then directed to the associated slip ring and brushes 58 and 62, respectively, and thence to the brush and holder 42, commutator 52, grounded brush and holder 44, and finally to ground 50. When such power is applied, the stator and armature are revolving in opposite directions at speeds proportional to wheel sizes with the opposite rotations being corrected by the one-to-one reversing mechanism 26 applied to either output shaft.

Similarly, if a reverse action is desired, power from the battery is applied to the slip ring and brushes 60, 64, to their reverse field coil 56 and then to brush and holder 42, commutator 52, grounded brush and holder 44, and finally to ground 50.

Figure 2:
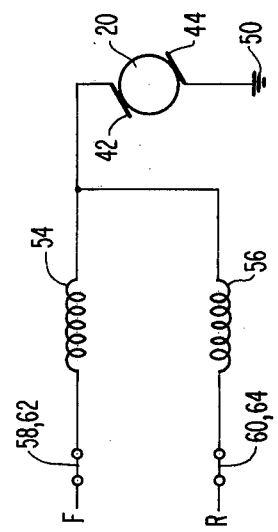
FIG. 2 is a simplified wiring diagram therefor.

In FIG. 2, the simplified wiring diagram of the above is shown for purposes of clarity.

In operation of the electric motor drive of this invention, the frame 12, as shown for example in FIGS. 3 and 4, is attached to the chassis 66 of an electirc motor vehicle with the opposite output shafts 16 and 34 extending outwardly of the frame to be drivingly connected to the drive wheels of the vehicle (one shown at 68 in FIGS. 3, 4 and 5). To accomplish this driving connection, the shafts 16 and 34 are provided with a pair of pulleys 70, 72 which are respectively connected to similar pulleys (one shown at 74, mounted on a dead axle shaft 76 of the vehicle by suitable belts 78 and 80). The dead axle shaft 76 is properly spaced positioned by a pair of adjustable length radius rods 84 which are firmly fastened to the dead axle shaft 76 with their opposite free ends journalled on cylindrical bosses 86, 88 formed on the opposite ends of the motor drive frame 12. These radius rods are adjustable in length by any suitable length adjusting means, such as a threaded or telescoping joint shown schematically at 90, to produce proper belt tension and will thereafter maintain proper pulley spacing and belt tension regardless of the up-and-down movements of the wheels over the roads. Lightweight coil suspension springs 92 of appropriate size are mounted at their lower ends on the shaft 76 and project upwardly toward the chassis 66 to which they can be attached by suitable fittings 94. Suitable bearing means 91 are provided for the dead axle 76 and conventional mountings for the wheel and tires 98, together with standard type brake plates and shoe assemblies 100, which are firmly attached to the dead axle in a position to operate against the inner surface 102 of the wheel pulley 74 and suitable snubbers may be contained within the coils of the suspension spring.

From the foregoing, it can be seen that when power is applied to the electric motor drive unit 10 through the appropriately selected slip ring connection, the output shaft pulleys 70 and 72 will begin to rotate in the same direction at equal speeds, but at one-half the relative armature and field structure r.p.m.'s assuming that both wheel and tire assemblies are of equal size and the vehicle moves in a straight line. However, in a turn of the vehicle, the inner wheel slows down, thus retarding its connection motor drive element, whereas the outer wheel will speed up together with its connected motor drive element, while the relative motor element speed remains substantially unchanged. Thus, it is obvious that this motor drive unit 10 is capable of a differential action and is also capable of a two-to-one reduction in output speed without the use of any speed reducing mechanism whatsoever. This valuable operational characteristic permits the use of a lightweight, compact, high-speed motor plus the elmination of the usual rear axle reduction gear and differential assembly with a consequent saving of cost, weight and friction losses.

Finally, while the wheels are shown as rear wheels in the drawings, it is obvious that the vehicle could be a front drive vehicle, if desired.

Figure 6:
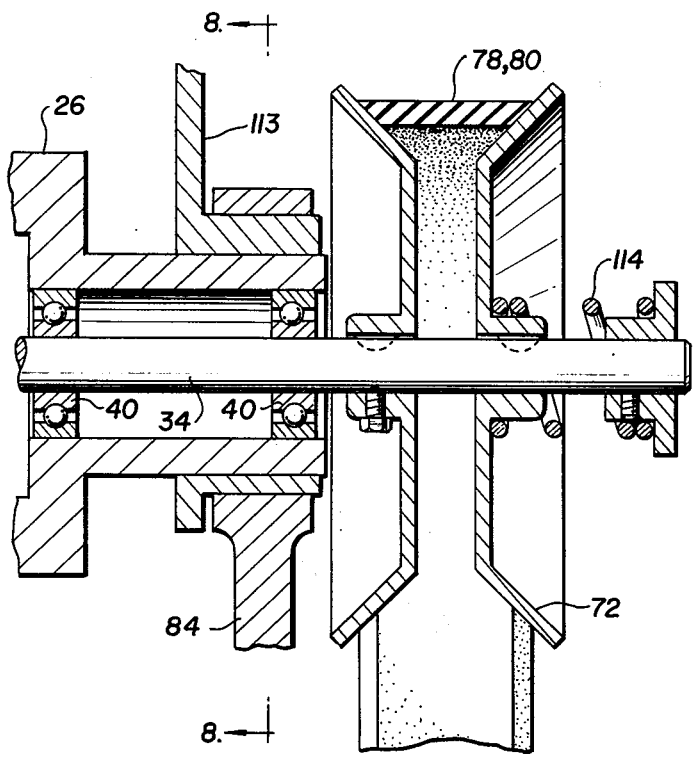
FIG. 6 is a sectional view of an alternate embodiment of FIG. 1.
Figure 7:
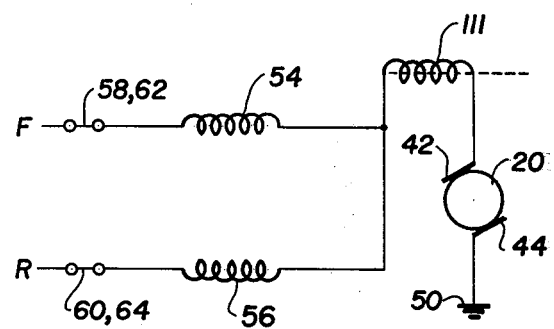
FIG. 7 is a schematic of the circuit in the alternate embodiment of FIG. 6.
Figure 8:
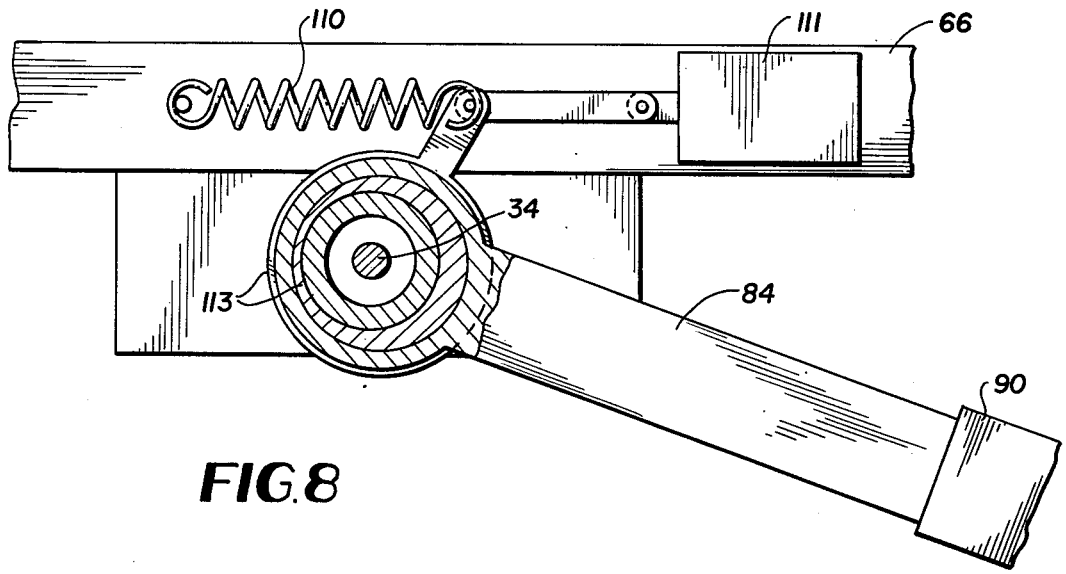
FIG. 8 is an end view of the alternate embodiment of FIG. 6 taken along lines 8-8.

FIGS. 6–8 show an alternative embodiment concerning the transmission of the generated power to the drive wheels shown in FIGS. 3–5. Whereas, in FIG. 4 there is shown a threaded or telescoping joint 90, which is used to vary the distance between the output shaft 34 to the dead axle 76, to provide a proper belt adjustment, FIGS. 6–8 teach a dynamic compensation device to adjust the belt tension while the vehicle is in motion, since joint 90 provides only a static adjustment. This dynamic compensation provides a powerful tool in extending the speed range of the drive motor in addition to absorbing surges when the control voltage applied to the motor is introduced in steps. In addition to increasing the speed range, the dynamic compensator provides improved acceleration and hill climbing since the belt tension is varied as a function of dead axle displacment and voltage input.

FIG. 6 depicts an output to belts 78–80 along shaft 34 generally similar to the right hand portion of FIG. 1 with a few notable exceptions: rods 84 overlie an eccentric bushing 113, pulley 72 is followed on shaft 34 by spring member 114, and the belt has a flat inner contour relative to the V-shape of the pulley 72.

FIG. 8 depicts an illustrative side view wherein it is seen that the eccentric bushing is rotated and regulated by the cooperation of electromagnet 111 which is biased by spring 110. The electromagnet and spring are carried on chassis 66.

FIG. 7 shows the manner in which the electromagnet is actuated in the circuit: it is connected in series between armature 20 and field coils 54 and 56.

In operation, FIG. 8 shows the eccentric in the full load position with full magnet power applied, thus placing the dead axle 76 in its farthest position from the drive motor while pulling the drive belt 78–80 down into the V somewhat further to effect a minimum drive pulley effective pitch diameter thereby increasing the mechanical advantage of the drive motor. As the vehicle speeds up, the motor load current will drop off and weaken the electromagnet which then allows the spring 110 to rotate the bushing forward thus pulling the rear axle closer to the drive pulley and allow belts 78–80 to work outward on the pulley V thus increasing the vehicle speed. The larger effective drive pulley diameter increases the load and causes the electromagnet to temporarily resist the spring to prevent further change in the drive ratio.

It can thus be seen that there is a constant balance between the magnet and the spring to place the drive belts in the most advantageous position in the pulleys in accordance with the load requirements of the vehicle. Although this discussion focused on the right hand side of FIG. 1, it will be appreciated that an analogous system is to exist on the left hand side along with synchronization of the pair of electromagnets at the extremities to insure equal movements as required.

What is claimed is:

1. A differential electric motor drive for driving a vehicle comprising:

a vehicle frame:

a drive wheel assembly, including a dead axle shaft; a pair of vehicle drive wheels rotatably mounted at opposite ends of the dead axle shaft, and elastic support means for supporting the vehicle frame on the dead axle;

a motor supporting frame mounted on the vehicle frame;

a first motor element rotatably mounted within said supporting frame and having means for creating an electric field therein;

a second motor element rotatably mounted within said first motor element;

each motor element having a motor element output shaft extending from one end thereof in opposite directions;

a final output shaft connected to one of said motor element output shafts;

a reverse mechanism for effecting said connection between said one motor element output shaft and said final output shaft in a 1:1 relationship for compensating for relative opposite rotation of said motor elements, the other motor element shaft and said final output shaft being connected by power transmission means to the vehicle drive wheels, and said power transmission means connecting said drive wheels to said motor drive comprising two pairs of cooperating driving and driven pulleys, the driving pulley of one pair being mounted on the final output shaft, the driving pulley of the other pair being mounted on the other motor element shaft, and the driven pulley of each pair being mounted on a respective one of said drive wheels, said pairs of cooperating pulleys being connected by suitable belt means, and adjustable means between the motor supporting frame and said dead axle shaft for maintaining proper spaced apart relation and tension between said belts and said pulleys; said means for creating an electric field within the first motor element includes: a first field coil for rotating the second motor element in one direction relative to the first motor element to effect forward movement of the vehicle; and a second field coil for rotating the second motor element in an opposite direction relative to the first motor element to effect backward movement of the vehicle.

2. The differential electric motor drive as claimed in claim 1, wherein said adjustable means comprises adjustable length radius rods.

3. The differential electric motor drive as claimed in claim 2, wherein said reverse mechanism includes a first gear connected to either of said motor elements, an idler gear and a third gear on said final output shaft meshing with said idler gear so that said final shaft rotates opposite to the rotation of said first gear.

4. The differential electric motor drive as claimed in claim 1, including means for connecting said field coils to a suitable source of power.

5. The differential electric motor drive as claimed in claim 1, wherein each driven pulley of the power transmission means is integrally associated with a driving wheel brake drum.

6. The differential electric motor drive as claimed in claim 5, wherein said belt means are V-belts and said pulleys are v-pulleys.

7. The differential electric motor drive as claimed in claim 1, wherein the cooperation of the associated elements produces a two-to-one reduction in speed of the output drive shafts.

8. The differential electric motor drive as claimed in claim 1, wherein said driving pulleys contain means to vary the tension of said belt means as a function of dead axle displacement and voltage input.

9. The differential electric motor drive as claimed in claim 8, wherein said means to vary the tension of said belt means comprises eccentric bushing means which underlie said driving pulleys, said eccentric bushings being rotatable by biased electromechanical means.

10. The differential electric motor drive as claimed in claim 9, wherein said biased electromechanical means comprises an electromagnet carried on said chassis connected in series with said armature, and biased by a spring carried on said chassis.

11. The differential electric motor drive as claimed in claim 10, wherein said means to vary the tension of said belt further includes means to allow said belt to travel radially inwardly and outwardly on said driving pulleys to provide changes in the effective pulley pitch diameter, said means comprising a driving pulley whose outer periphery has a generally V-shaped contour and said belt is substantially flat.

* * * * *